United States Patent [19]
Beckley et al.

[11] Patent Number: 4,689,991
[45] Date of Patent: Sep. 1, 1987

[54] FLUID-GAUGING PROBES AND THEIR MANUFACTURE

[75] Inventors: Keith A. Beckley, Cheltenham; Neil R. Jacob; Geoffrey A. Trussler, both of Basingstoke, all of England

[73] Assignee: Smiths Industries Public Limited Company, London, England

[21] Appl. No.: 862,871

[22] Filed: May 13, 1986

[30] Foreign Application Priority Data

May 22, 1985 [GB] United Kingdom ............... 8512907

[51] Int. Cl.⁴ ...................... G01F 23/26; H01G 5/28
[52] U.S. Cl. ................................ 73/304 C; 324/61 P; 361/284
[58] Field of Search ............... 73/304 C; 29/592 R; 324/61 P; 340/620; 361/284

[56] References Cited

U.S. PATENT DOCUMENTS

| 2,789,435 | 4/1957 | Weiss | 73/304 C |
|---|---|---|---|
| 3,349,301 | 10/1967 | Bell | 73/304 C |
| 3,512,252 | 5/1970 | Sargent | 361/284 |
| 3,827,300 | 8/1974 | Thaler | 361/284 |
| 4,467,646 | 8/1984 | Berryman et al. | 73/304 C |
| 4,487,066 | 12/1984 | Pardi et al. | 73/304 C |

FOREIGN PATENT DOCUMENTS 724932 3/1980 U.S.S.R. ............................ 73/304 C

Primary Examiner—Richard R. Stearns
Attorney, Agent, or Firm—Pollock, Vande Sande and Priddy

[57] ABSTRACT

A characterized inner electrode for a capacitive fuel-gauging probe comprises several discrete tubular sections of different diameters which are joined together end-to-end by metal coupling pieces. One or more of the tubular sections has two regions of different diameters that are continuous with one another, the smaller diameter region being formed by swaging down from the larger diameter region. The coupling piece has two shoulders to which the ends of the tubular sections are electron-beam welded. The coupling piece also has respective annular recesses into which a low viscosity adhesive is introduced via overlying apertures in the tubular sections after welding, so as to form an adhesive joint between the coupling piece and the tubular sections. The ends of the coupling piece are a close fit within the tubular sections and extend into them by a distance at least twice the diameter of the coupling piece.

10 Claims, 2 Drawing Figures

FLUID-GAUGING PROBES AND THEIR MANUFACTURE

BACKGROUND OF THE INVENTION

This invention relates to fluid-gauging probes and their manufacture.

Fuel and other fluid levels in, for example, aircraft may be measured by means of a capacitance probe comprising an outer tubular electrode and an inner coaxial electrode. The probe is mounted to extend vertically in the fuel tank such that fuel fills the outer electrode to the same height as fuel in the tank. As the fuel level in the tank changes, therefore, a corresponding change in the level of fuel in the outer electrode is produced which causes a change in the value of capacitance between the two electrodes. By measuring the capacitance, the fuel level can be determined.

In many applications, the tank in which the probe is mounted does not have the same sectional area or profile at all heights, so that the same change in volume of fuel will not produce an identical change in depth at different heights. This, therefore, would cause the output of a conventional probe to be non-linear with volume. In order to compensate for this, the probe is commonly characterized in some way so that its output changes uniformly with volume, rather than with height. The usual way of characterizing such a probe is by varying the diameter of the inner electrode along its length. In this way, the gap between the inner electrode and outer electrode varies so that the change in capacitance as the gap is filled with fuel correspondingly varies.

The inner electrode can be constructed in different ways. The electrode could be machined with the required profile from a solid rod of material. This, however, is an expensive process and results in a heavy electrode which puts a correspondingly greater stress on its mounting when subject to vibration and shock. A thinner electrode can be produced by electro-depositing a metal coating onto a mandrel preformed to the required shape, the mandrel subsequently being dissolved or melted away to leave the outer metal shell. This electro-deposition process requires an expensive manufacturing plant which is not justified for only making low numbers of probes. The process itself is also expensive because of the need to make a mandrel for every probe. Another form of electrode is made up of discrete lengths of tubing of different diameters joined together by means of coupling pieces and rivets. This form of probe also has disadvantages, however, in that it can be difficult to establish a good electrical continuity between the different sections of tubing. This can be aggravated in time if the coupling pieces or tubing becomes corroded. Vibration and other forces on the probe can also produce high stresses on the joints and tend to loosen them. The rivets and the holes through the rivets cause electrical non-uniformity in the region of the joints and can affect the probe characteristic for fuel levels in these regions.

BRIEF SUMMARY OF THE INVENTION

It is an object of the present invention to provide a fluid-gauging probe and electrode which can be used to alleviate these disadvantages.

According to one aspect of the present invention there is provided a tubular inner electrode for a capacitive fluid-gauging probe, the electrode having different diameters at different points along its length, the inner electrode including at least two discrete tubular sections of different diameters that are coupled with one another, at least one of the tubular sections having two regions of different diameters that are integral with one another, the region of smaller diameter being formed by mechanically reducing the diameter of the section from that of the region of larger diameter, and the other of the tubular sections having a diameter different from that of the region of the said one secton to which it is coupled.

The region of smaller diameter may be formed by swaging down the tubular section from the diameter of the region of larger diameter. One of the tubular sections may have a constant diameter along its length. Each tubular section may be of aluminum.

The two sections are preferably coupled together by a joint including a substantially cylindrical metal coupling piece one end of which projects within one tubular section and the other end of which projects within the other tubular section, the coupling piece having respective shoulders between its ends against which each tubular section abuts and is welded, and each end of the coupling piece having a respective recess containing an adhesive which forms an adhesive joint between the coupling piece and the respective tubular sections.

The weld between the shoulders and the respective tubular section may be an electron-beam weld. The recess may be an annular recess around the coupling piece.

Each tubular section may have an aperture overlying the respective recess by which the adhesive is introduced to the recess after the tubular sections have been welded to the coupling piece. The adhesive is preferably a low viscosity adhesive and may be a cryanoacrylate adhesive. The length of each end of the coupling piece that projects within the respective tubular section is preferably at least twice the diameter of the respective end. The coupling piece may be of aluminum. Each end of the coupling piece is preferably an interference fit within the respective tubular section.

According to another aspect of the present invention there is provided a capacitive fluid-gauging probe including an outer tubular electrode and an inner electrode according to the above-mentioned one aspect of the present invention.

According to a further aspect of the present invention there is provided a method of manufacturing a tubular inner electrode of a capactive fluid-gauging probe comprising the steps of: providing a first tubular section of a first diameter; mechanically reducing the diameter of a region of said first section to produce a second region along said section of a second diameter less than said first diameter; providing a second tubular section having a region at least of its length of a third diameter different from said first or second diameter; and joining said second section to the region of said first section having a diameter different from that of said second tubular section.

The second region may be produced by swaging down the first section from the diameter of the first region. The first section is preferably trimmed to a desired length after providing the second region. The second section may be joined to the first section by means of a metal coupling piece, opposite ends of the metal coupling piece being inserted in the end of the respective first and second sections, the two sections being welded to the coupling piece, and an adhesive being subsequently introduced between the ends of the coupling piece and both the tubular sections such as to form an adhesive joint between the tubular sections and the coupling piece. The two sections may be electron-beam welded to the coupling piece.

According to yet another object of the present invention there is provided a tubular inner electrode of a capacitive fluid-gauging probe manufactured by the above-mentioned further aspect of the present invention.

An aircraft capacitance fuel-gauging probe and its method of manufacture in accordance with the present invention, will now be described, by way of example, with reference to the accompanying drawings.

DETAILED DESCRIPTION

Figure 1:
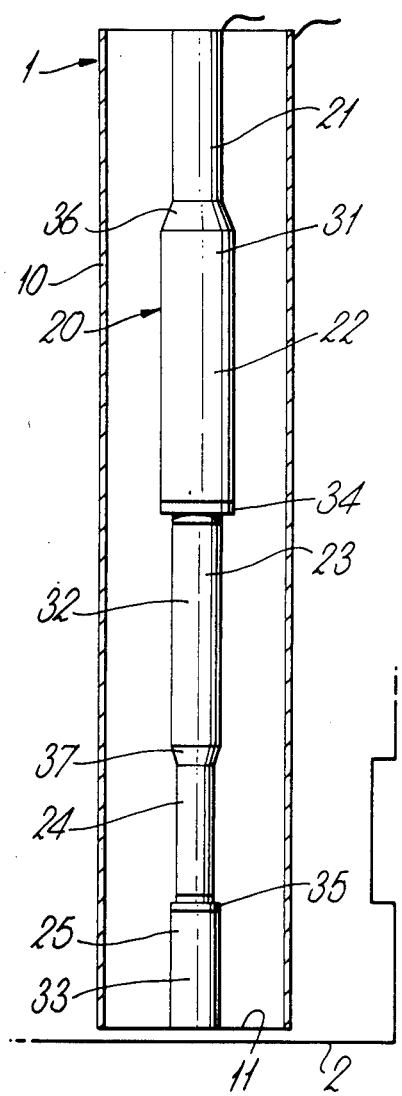
FIG. 1 is a partly cut-away side elevation of the probe.

With reference first to FIG. 1, the fuel-gauging probe 1 is mounted to extend vertically in a fuel tank 2. The probe has an outer tubular electrode 10 of aluminum that is open at the lower end 11 of the probe 1 so that it is filled with fuel to the same height as fuel in the tank 2. An inner electrode 20 extends coaxially within the outer electrode 10 being separated from it by an air gap that is filled or emptied as the level of fuel changes, thereby changing the capacitance between the two electrodes. The fuel level is measured in the usual way by measuring the capacitance between the two electrodes 10 and 20.

The fuel tank 2 has an irregular profile such that a unitary change in depth of fuel at different heights is equivalent, in general, to different changes in volume. To ompensate for this, the inner electrode 20 is characterized by varying its diameter along its length, such that the same change in volume of fuel at any height produces the same change in capacitance of the probe 1. In this way, the capacitance output of the probe 1 can be used directly to provide a measure of fuel volume.

In the present example, the inner electrode 20 has five regions 21 to 25 along its length of different diameters corresponding to equivalent regions of the tank 2 where horizontal sections of the tank have different areas. The electrode 20 is made up of three discrete tubular sections 31 to 33 that are joined end to end by coupling pieces 34 and 35, although any number of sections can be similarly coupled together. Each section is made of a low-copper aluminum NT4 and is of circular cross section. The upper two sections 31 and 32 each have two regions of differing diameters that are integral and continuous with one another. The smaller diameter region 21 or 24 is formed by reducing the diameter of the section from that of the larger region. This may be done by swaging or any similar mechanical operation. The swaging process will produce a short tapered region 36 and 37 in each section between the two regions of different diameter.

The lower section 33 has a constant diameter along its length.

Figure 2:
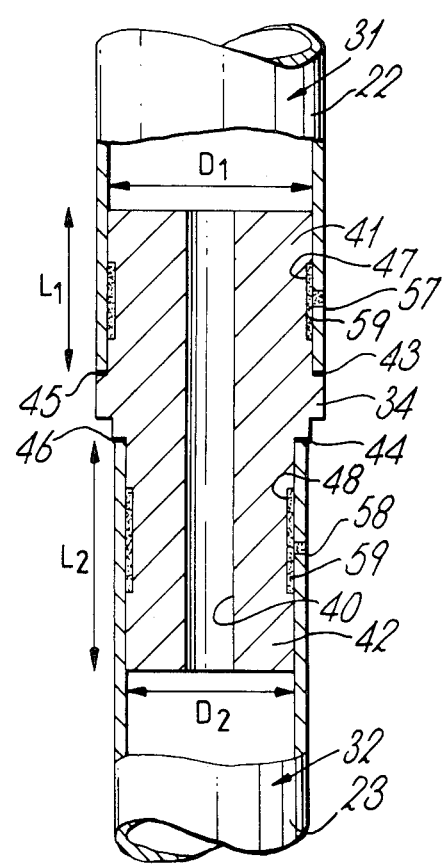
FIG. 2 is a sectional side elevation showing a part of the probe in greater detail.

With reference now also to FIG. 2, the coupling piece 34 will now be described in greater detail. The coupling piece 34 is of unitary, one-piece construction and is machined from aluminum NE8. The shape of the coupling piece 34 is generally cylindrical and tubular, having a longitudinal bore 40. Opposite ends 41 and 42 project within the lower end of the upper section 31 and the upper end of the intermediate section 32 respectively, each end being of a close, interference fit within the respective sections. Two annular shoulders 43 and 44, equal in height to the thickness of the sections 31 and 32, are formed towards the center of the coupling piece 34. Each annular shoulder 43 and 44 abuts the end of respective sections 31 and 32 and limits the extent of penetration of the coupling piece into the tubular sections. In this respect, the distance (L1 and L2) by which opposite ends of the coupling piece 34 project into the tubular sections 31 and 32 is preferably at least about twice the diameter (D1 and D2) of the end of the coupling piece within that tubular section.

An orbital electron beam weld joint 45 and 46 is formed between the shoulders 43 and 44 and the end of the abutting tubular section.

The joint between the coupling piece 34 and the tubular sections 31 and 32 is further enhanced by means of an adhesive 59. A shallow annular recess 47 and 48 is provided around opposite ends of the coupling piece 34 to underlie the tubular sections 31 and 32, typically of a depth between 0.05 mm and 0.08 mm and this is filled with adhesive 59 to form an additional joint between the coupling piece and tubular sections.

The other coupling piece 35 is of similar shape to the coupling piece 34 described, although its dimensions are different to provide a similar interference fit.

Manufacture and assembly of the inner electrode 20 is relatively simple and of low cost. First, two lengths of stock tubing are selected equal in diameter respectively to the larger regions 22 and 23 of the electrode 20. On one of each length of tubing is then swaged down in diameter to that required for the smaller regions 21 and 24. Each piece of tubing is then trimmed at opposite ends to give the required length for each region and is thoroughly cleaned. The lower tubular section 33 can be cut directly from stock tubing. The coupling pieces 34 and 35 are similarly cleaned and pushed into the respective tubular sections 31, 32 and 33 as an interference fit. In this respect, the ends of each tubular section 31 to 33 will need to be reamed to produce an interference fit. To aid insertion it may be necessary to use methylated spirits as a lubricant. After assembly, an orbital electron beam weld 45 and 46 is formed between the coupling pieces 34 and 35 and the tubular sections 31 and 32, 32 and 33. Once the welds have been made, the adhesive can be introduced between the coupling pieces and the tubular sections. To do this, a small aperture 57 and 58 is provided in each section overlying the respective recess 47 and 48 in the coupling piece. A low viscosity adhesive 59, such as a cyranoacrylate adhesive, is then introduced via the apertures 57 and 58 which wicks around the recess 47 and 48 by capillary action. It is preferable to apply the adhesive 59 after welding since otherwise the adhesive could evaporate and interfere with the welding process when the vacuum required for the welding is pulled.

The number of joints is reduced in this assembly by forming two regions of different diameters in a unitary one-piece section. It has been found preferable only to have two regions of different diameters in any section when the diameter is reduced by swaging or a similar mechanical process since further working of the material, in order to produce a third region, is liable to produce deformation, distortion and inaccuracies.

The welded joints provided by the present invention produce good electrical continuity between adjacent sections. The mechanical properties of the joint are improved by having a close, interference fit, by the length of the coupling member that projects into the tubular section, and by the adhesive. This ensures that any mechanical deformation or flexing of the inner electrode is not communicated directly to the weld, which is important since the welded metal will be weaker than the tubular section itself.

What we claim is:

1. A tubular inner electrode of the kind for a capacitive fluid-gauging probe, said electrode having at least three different diameters at different points along its length, the improvement wherein said inner electrode comprises at least two discrete tubular sections and a substantially cylindrical metal coupling piece coupling said tubular sections with one another, wherein at least one of said tubular sections consists of only two cylindrical regions, namely a first region of one diameter providing a first end of the tubular section and a second region integral with said first region providing an opposite end of the tubular section, said second region having a second diameter formed by mechanically reducing the diameter of the section from that of said first region, wherein one end of said coupling piece projects within one end of said one tubular section, and wherein the other end of said coupling piece projects within one end of the said other tubular section, the said one end of said one tubular section having a diameter different from that of the said one end of the said other tubular section.

2. An electrode according to claim 1, wherein the said second region of said one tubular section is formed by swaging down the one section from the diameter of the first region.

3. An electrode according to claim 1 wherein the said metal coupline piece has respective first and second shoulders between its ends, wherein the said one ends of the said one and other tubular sections abut and are welded to the first and second shoulders respectively, wherein the said one and other ends of said coupling piece have respective recesses, and wherein each said recess contains an adhesive which forms an adhesive joint between said coupling piece and the respective tubular section.

4. An electrode according to claim 3, wherein each said tubular section includes an aperture overlying the said respective recess by which adhesive is introduced to the respective recess after the said tubular sections have been welded to the said coupling piece.

5. An electrode according to claim 3, wherein the adhesive is a low-viscosity cryanoacrylate adhesive.

6. A capacitive fluid-gauging probe for use in a fluid tank of irregular profile, said probe including an outer tubular electrode and an inner tubular electrode, said inner electrode being characterized to the profile of the tank such that the output of the probe varies substantially linearly with fluid volume, wherein said inner electrode comprises at least two discrete tubular sections and a substantially cylindrical metal coupling piece, said metal coupling piece having two ends that project as a close fit within respective ends of the two tubular sections, wherein said coupling piece has respective first and second shoulders between its ends to which the respective tubular sections are welded, wherein both the ends of the coupling piece have an annular recess around them, wherein both said tubular sections include an aperture overlying the said resective recess by which adhesive is introduced to the recess to form an adhesive joint between said coupling piece and the respective tubular section after welding the tubular section to the said coupling piece, wherein at least one of the tubular sections has a first region of one diameter and a second region integral with said first region, said second region having a second diameter formed by swaging down the diameter of the said one section from that of said first region, and wherein the said other tubular section has a diameter different from that of the region of the said one section to which it is coupled.

7. A method of manufacturing a tubular inner electrode of a capacitive fluid-gauging probe comprising the steps of: providing a first tubular section of a first diameter; mechanically reducing the diameter of a first region of said first section providing a first end of said first section to produce a second region only along said section of a second diameter different from said first diameter which provides the opposite end of said first tubular section; providing a second tubular section having at least a region of its length of a third diameter different from said first or second diameter; providing a substantially cylindrical metal coupling piece; inserting one end of said coupling piece into one end of said first tubular section; and inserting the other end of said coupling piece into one end of the said other tubular section and joining said coupling piece with said other tubular section such that the first and second tubular sections are thereby joined together with the one end of said first tubular section differing in diameter from the diameter of the said one end of the said other tubular section.

8. A method according to claim 7, wherein the said second region is produced by swaging down the said first section from the diameter of the said first region.

9. A method according to claim 7, wherein the said first section is trimmed to a desired length after producing the said second region.

10. A method according to claim 7 wherein said first and second sections are welded to said coupling piece, and wherein an adhesive is subsequently introduced between annular recesses formed in the ends of said coupling piece and both said tubular sections such as to form an adhesive joint between the tubular sections and the coupling piece.

* * * * *